United States Patent
Hoffman et al.

(10) Patent No.: US 9,752,946 B2
(45) Date of Patent: Sep. 5, 2017

(54) COOLING FOR INDUSTRIAL PROCESS VARIABLE TRANSMITTERS

(71) Applicant: Rosemount Inc., Chanhassen, MN (US)

(72) Inventors: Michael James Hoffman, Rosemount, MN (US); Paul Ryan Fadell, Spring Lake Park, MN (US); Fred C. Sittler, Excelsior, MN (US)

(73) Assignee: Rosemount Inc., Chanhassen, MN (US)

( * ) Notice: Subject to any disclaimer, the term of this patent is extended or adjusted under 35 U.S.C. 154(b) by 172 days.

(21) Appl. No.: 14/493,679

(22) Filed: Sep. 23, 2014

(65) Prior Publication Data

US 2016/0084725 A1 Mar. 24, 2016

(51) Int. Cl.
| | |
|---|---|
| *G01L 19/04* | (2006.01) |
| *G01L 19/06* | (2006.01) |
| *F16L 23/00* | (2006.01) |
| *F16L 53/00* | (2006.01) |
| *F25B 21/02* | (2006.01) |
| *G01L 19/00* | (2006.01) |

(52) U.S. Cl.
CPC ............ *G01L 19/04* (2013.01); *F16L 23/006* (2013.01); *F16L 53/00* (2013.01); *F25B 21/02* (2013.01); *G01L 19/0046* (2013.01); *G01L 19/0092* (2013.01); *G01L 19/0681* (2013.01)

(58) Field of Classification Search
CPC ......... F16L 23/006; F16L 53/00; F25B 21/02; G01L 19/0046; G01L 19/0092; G01L 19/04; G01L 19/0681; G01L 19/0007
See application file for complete search history.

(56) References Cited

U.S. PATENT DOCUMENTS

| 4,169,387 A | 10/1979 | Krempl |
| 4,722,228 A * | 2/1988 | Awa ...................... G01F 23/164 |
| | | 73/301 |
| 5,046,365 A | 9/1991 | Kumley et al. |

(Continued)

FOREIGN PATENT DOCUMENTS

| CA | 1 192 418 | 8/1985 |
| DE | 2 211 609 | 9/1973 |

(Continued)

OTHER PUBLICATIONS

Invitation to Pay Additional Fees from PCT/US2015/035244, dated Feb. 11, 2016.

(Continued)

*Primary Examiner* — Francis Gray
(74) *Attorney, Agent, or Firm* — Westman, Champlin & Koehler, P.A.

(57) ABSTRACT

A pressure transmitter assembly for measuring a process pressure of an industrial process includes a pressure sensor configured to sense the process pressure. A process coupling couples the pressure sensor to the industrial process. In one example configuration, a phase change material carried in the process coupling is configured to reduce heat transfer from the industrial process to the process variable sensor by changing phase in response to heat from the industrial process. In another example configuration, a thermocouple electric cooling element is coupled to the process coupling and configured to conduct heat away from the coupling in response to an applied electric current.

28 Claims, 6 Drawing Sheets

(56) References Cited

U.S. PATENT DOCUMENTS

| | | | |
|---|---|---|---|
| 5,292,195 A | | 3/1994 | Crisman, Jr. |
| 5,495,768 A | | 3/1996 | Louwagie et al. |
| 5,709,337 A | | 1/1998 | Moser et al. |
| 6,038,961 A | * | 3/2000 | Filippi ............... G01L 19/0645 29/454 |
| 6,059,254 A | | 5/2000 | Sundet et al. |
| 6,120,033 A | * | 9/2000 | Filippi ............... G01L 19/0046 277/315 |
| 6,295,875 B1 | * | 10/2001 | Frick .................... G01L 9/0072 73/718 |
| 6,484,585 B1 | * | 11/2002 | Sittler .................. G01L 9/0075 73/718 |
| 7,036,381 B2 | | 5/2006 | Broden et al. |
| 7,080,558 B2 | | 7/2006 | Broden |
| 7,258,017 B1 | | 8/2007 | Hedtke |
| 7,258,021 B2 | | 8/2007 | Broden |
| 7,373,831 B2 | | 5/2008 | Broden |
| 7,377,174 B2 | | 5/2008 | Sundet |
| 7,497,123 B1 | | 3/2009 | Behm et al. |
| 7,784,351 B2 | | 8/2010 | Schumacher |
| 7,980,481 B2 | * | 7/2011 | Fandrey ............ G05D 23/1917 137/343 |
| 2005/0126296 A1 | | 6/2005 | Hedtke |
| 2005/0284227 A1 | | 12/2005 | Broden et al. |
| 2006/0162459 A1 | | 7/2006 | Broden |
| 2007/0220985 A1 | | 9/2007 | Hedtke |
| 2007/0234813 A1 | | 10/2007 | Hedtke |
| 2007/0272027 A1 | | 11/2007 | Hedtke |
| 2008/0083445 A1 | * | 4/2008 | Chakraborty ........... H01L 35/30 136/205 |
| 2010/0307254 A1 | | 12/2010 | Klosinski |
| 2012/0192574 A1 | * | 8/2012 | Ghoshal ................. F25B 21/02 62/3.2 |
| 2013/0005272 A1 | * | 1/2013 | Shah .................. H04B 1/70754 455/67.11 |
| 2013/0005372 A1 | * | 1/2013 | Strei ...................... H01L 35/30 455/500 |
| 2014/0090476 A1 | | 4/2014 | Miller et al. |
| 2016/0084725 A1 | | 3/2016 | Hoffman et al. |

FOREIGN PATENT DOCUMENTS

| | | |
|---|---|---|
| DE | 25 23 869 | 12/1976 |
| DE | 2808469 | 9/1979 |
| DE | 297 03 013 | 5/1997 |
| DE | 10 2005 061 217 | 4/2007 |
| EP | 0 812 414 | 12/1997 |
| EP | 1 364 174 | 11/2003 |
| WO | 2007/052253 | 5/2007 |
| WO | WO 2009/078918 | 6/2009 |

OTHER PUBLICATIONS

Notification of Transmittal of the International Search Report and the Written Opinion of the International Searching Authority from PCT/US2015/046657, dated Nov. 20, 2015.

Model 1199 Diaphragm Seal Systems Manual, Rosemount, Fisher-Rosemount, 1997, p. iii-4-2.

Office Action from German Patent Application No. 102005012439.2, dated Jul. 23, 2007.

Office Action from Chinese Patent Application No. 200510054976.X, dated Aug. 24, 2007.

Invitation to Pay Additional Fees and Where Applicable, Protest Fee, from PCT/US2014/051628, dated Nov. 25, 2014.

Notification of Transmittal of the International Search Report and the Written Opinion of the International Searching Authority for PCT/US2015/035244, dated May 19, 2016.

Office Action from U.S. Appl. No. 14/501,691, dated Oct. 4, 2016.

Office Action from U.S. Appl. No. 14/501,691, dated May 18, 2016.

Office Action from U.S. Appl. No. 15/277,129, dated Dec. 29, 2016.

Communication Pursuant to Rules 161(1) and 162 EPC from European Patent Application No. 15797472.6, dated Feb. 2, 2017.

Notification of Transmittal of the International Search Report and the Written Opinion of the International Searching Authority from PCT/US2016/053895, dated May 12, 2017.

* cited by examiner

COOLING FOR INDUSTRIAL PROCESS VARIABLE TRANSMITTERS

BACKGROUND

The present invention relates to process control transmitters of the type used in industrial process monitoring and control systems. More specifically, the present invention relates to transmitters which measure process variables in high temperature environments.

Process monitoring and control systems are used to monitor and control operation of industrial processes. Industrial processes are used in manufacturing to produce various products such as refined oil, pharmaceuticals, paper, foods, etc. In large scale implementations, these processes must be monitored and controlled in order to operate within the desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. (However, field may also include devices positioned locally.) Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4 20 mA range can be mapped to corresponding values of the process variable.

One type of transmitter is a pressure transmitter. In general, a pressure transmitter is any type of a transmitter which measures a pressure of a fluid of the process. (The term fluid includes both gas and liquids and their combination.) Pressure transmitters can be used to measure pressures directly including differential, absolute or gauge pressures. Further, using known techniques, pressure transmitters can be used to measure flow or level of the process fluid based upon a pressure differential in the process fluid between two locations.

Typically, a pressure transmitter includes a pressure sensor which couples to the pressure of the process fluid through an isolation system. The isolating system can comprise, for example, an isolation diaphragm which is in physical contact with the process fluid and an isolation fill fluid which extends between the isolation diaphragm and the pressure sensor. The fill fluid preferably comprises a substantially incompressible fluid such as an oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, transmitters may have a maximum operating temperature of 185° F. Certain transmitters designed for high temperature operation may extend this to 250° F. to 300°. Temperature extremes can still cause errors in pressure measurements. In processes which have temperatures which exceed the maximum temperature of the pressure transmitter, the transmitter itself must be located remotely from the process fluid and coupled to the process fluid using a long capillary tube. The capillary tube can run many feet and an isolation fluid is carried in tube. One end of the tube mounts to the process through an isolation diaphragm and the other end of the tube couples to the pressure transmitter. This long capillary tube and isolation diaphragm is generally referred to as a "remote seal."

SUMMARY

A pressure transmitter assembly for measuring a process pressure of an industrial process includes a pressure sensor configured to sense the process pressure. A process coupling couples the pressure sensor to the industrial process. In one example configuration, a phase change material carried in the process coupling is configured to reduce heat transfer from the industrial process to the process variable sensor by changing phase in response to heat from the industrial process. In another example configuration, a thermocouple electric cooling element is coupled to the process coupling and configured to conduct heat away from the coupling in response to an applied electric current.

This Summary and Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
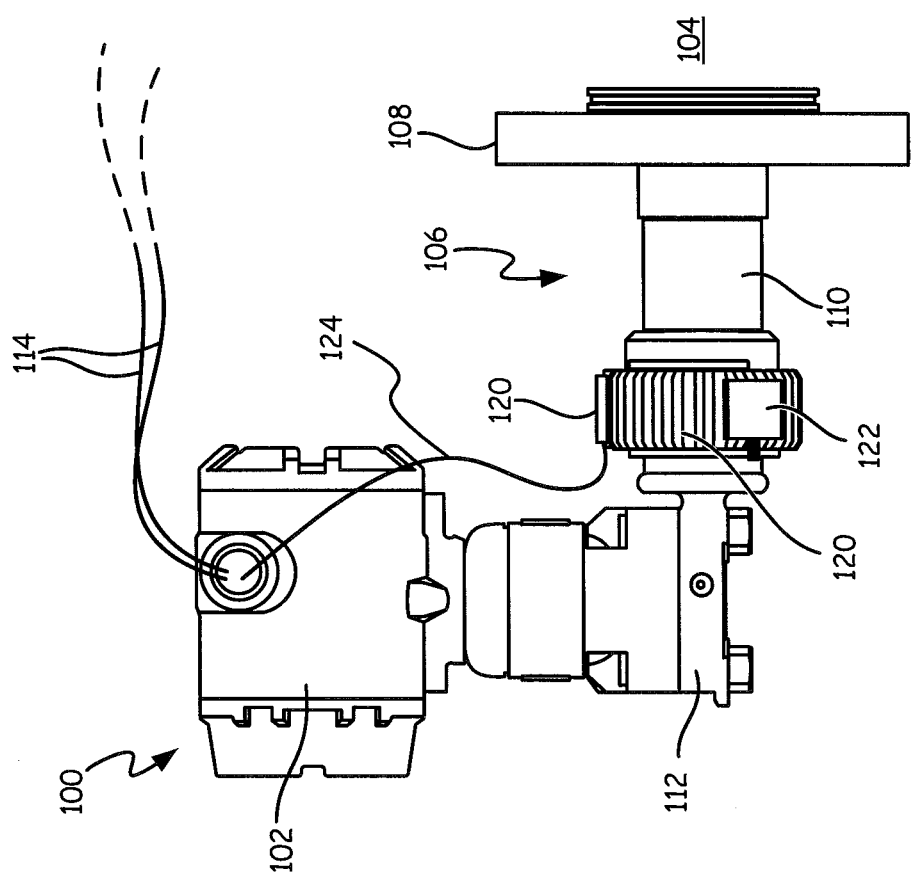
FIG. 1 is a side plan view of a process variable transmitter assembly coupled to an industrial process.

The present invention is directed to industrial transmitters of type used to measure a process variable of a process fluid in which the process fluid and/or process environment may experience relatively high temperatures. Configurations are provided to reduce the heat transferred from the industrial process to the process variable sensor and transmitter electronics. In one example configuration, a phase change material is employed to reduce heat transfer. In another example configuration, a thermal electric cooling element is provided to reduce the heat transfer. These configurations may be implemented independently or in combination. The configurations do not require the remote seal technique discussed in the background section.

Electronic industrial pressure transmitters which are employed in the process industry such as pharmaceutical, biotechnology, food and beverage technologies and others, often have special requirements. For example, they may often be required to measure the pressure of process fluid at very high temperatures. They are often required to survive very high temperatures during cleaning processes which occur between both "batches" of processing. The cleaning processes are referred to as "Clean In Place" (CIP) and/or "Sterilize In Place" (SIP). These processes expose process interfaces to temperatures of over 200° C. Further, it is desirable that the pressure measurement transmitter not only survive the cleaning process, but also provide minimal error during and after the cleaning process. This allows the next "batch" to begin processing as soon as possible. If the errors are present during the cleaning process, then it is desirable that the measurement device return to its calibration parameters quickly and without a shift in the output following the cleaning process.

Conventional industrial pressure transmitter are capable of surviving and performing nominally at temperatures of up to about 185° F. Some specifically designed transmitters configured for high temperature operation may extend this to 250° F. to 300° F. However, beyond these temperatures, substantial errors and/or complete failure of the device may occur, for example due to overheating of electronic components. As discussed in the Background section, remote seals (secondary fill systems, also referred to as chemical seals) can be used to meet the needs of high temperature process environments. These seals can often survive temperatures beyond 390° F. However, such configurations have a number of drawbacks. For example, substantial measurement errors may be associated with increased process temperature, as much as 15%. Further, the configuration may lead to poor temperature transient behavior, i.e., large errors and slow recovery. The configuration also introduces drift and non-repeatable errors when returning from high temperature cleaning to the baseline operating temperature. They may also not be able to accurately measure pressure during the cleaning process.

The industrial pressure transmitter of the present invention provides improved performance in high temperature processes, and in processes which experience intermittent high temperatures such as those experienced during tank cleaning (CIP and SIP). The improvements include the increased high process temperature capability and reliability, reduced errors during measurement while under high process temperatures, reduced errors when returning to normal operation from high temperatures, and improved speed of return from transient temperatures.

Figure 2:
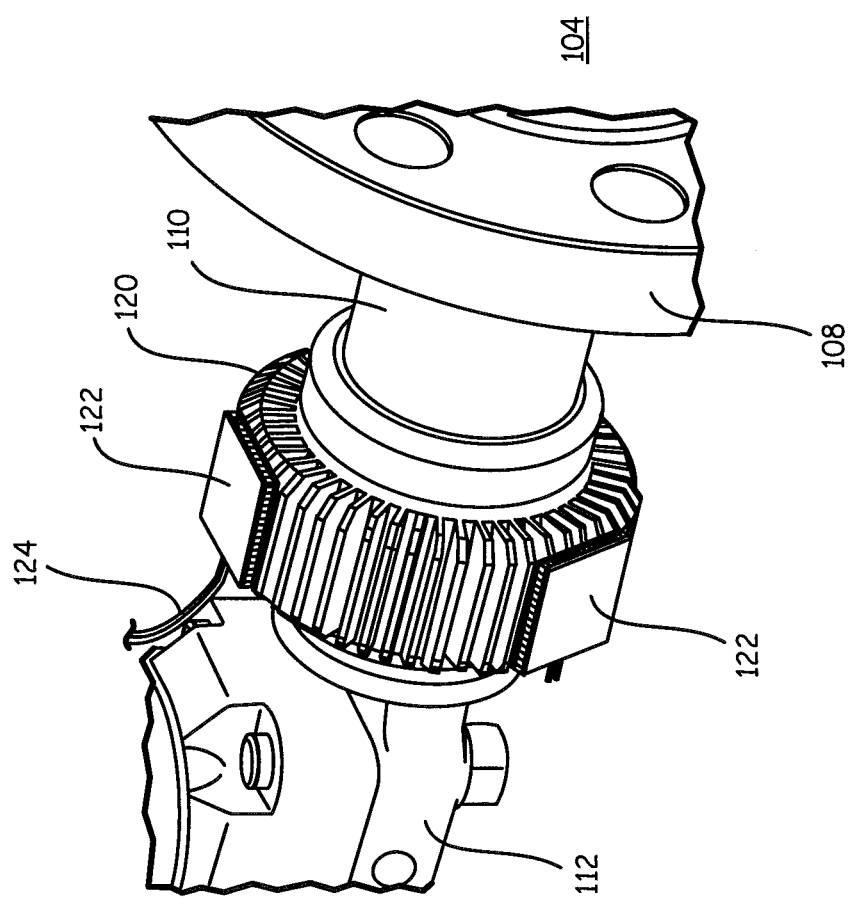
FIG. 2 is an enlarged perspective view of the process variable transmitter assembly of FIG. 1.

FIG. 1 is a side plan view and FIG. 2 is a partial perspective view of a pressure transmitter assembly 100 which includes a pressure transmitter 102 coupled to an industrial process fluid 104 through a process coupling 106. Coupling 106 includes a process flange face 108 configured to mount to a process vessel such as a container, pipe, etc. A pressure from a process fluid 104 is conveyed through the flange 108, through a capillary tube 302 (shown in FIG. 3) carried in an elongate housing 110 and to a transmitter flange 112 of process variable transmitter 102. A pressure sensor (not shown in FIG. 1 or 2) in the process variable transmitter 102 senses the applied process pressure. Information related to the sensed applied sensed applied process pressure is conveyed to another location. For example a remote process control room through a two-wire process control loop. An example two-wire process control loop 114 is illustrated in FIG. 1 and may operate in accordance with any appropriate protocol including the HART® communication protocol in which digital information is modulated on to a 4-20 mA current, the Foundation Fieldbus or Profibus communication protocols, etc., or through a wireless communication protocol such as the WirelessHART® communication protocol in accordance with IEC 62591.

FIGS. 1 and 2 also illustrate a heat sink 120 of the process coupling 106. Heat sink 120 consists of a plurality of fins and is thermally coupled to the elongate housing 110. In one embodiment, thermal electric cooling elements 122 thermally couple to heat sink 120. Thermal electric cooling elements 122 are electrically coupled to circuitry (not shown in FIG. 1) within the transmitter 102 through electrical connection 124.

Figure 3A:
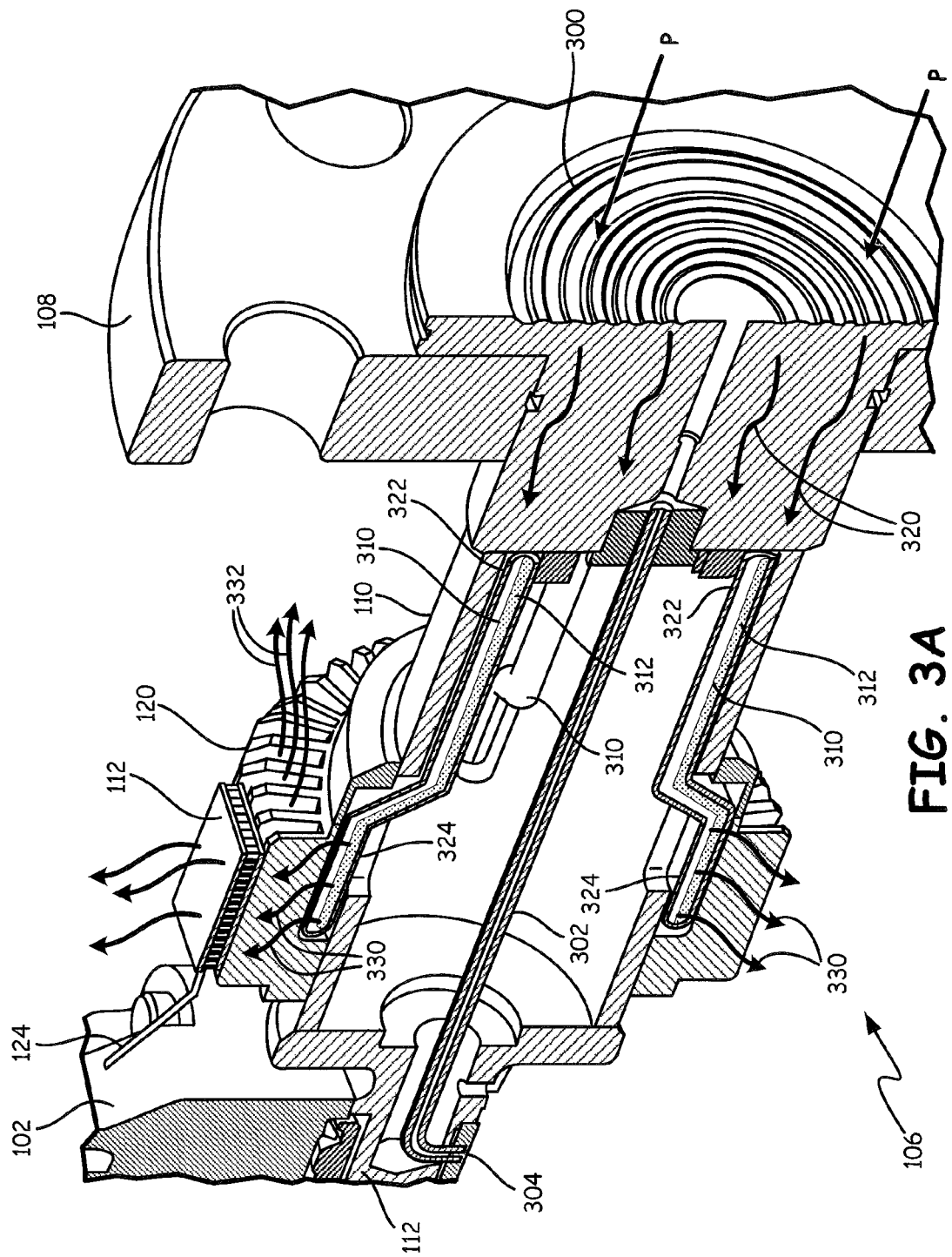
FIG. 3A is a side perspective, cross sectional view of the process variable transmitter assembly of FIG. 1.
Figure 3B:
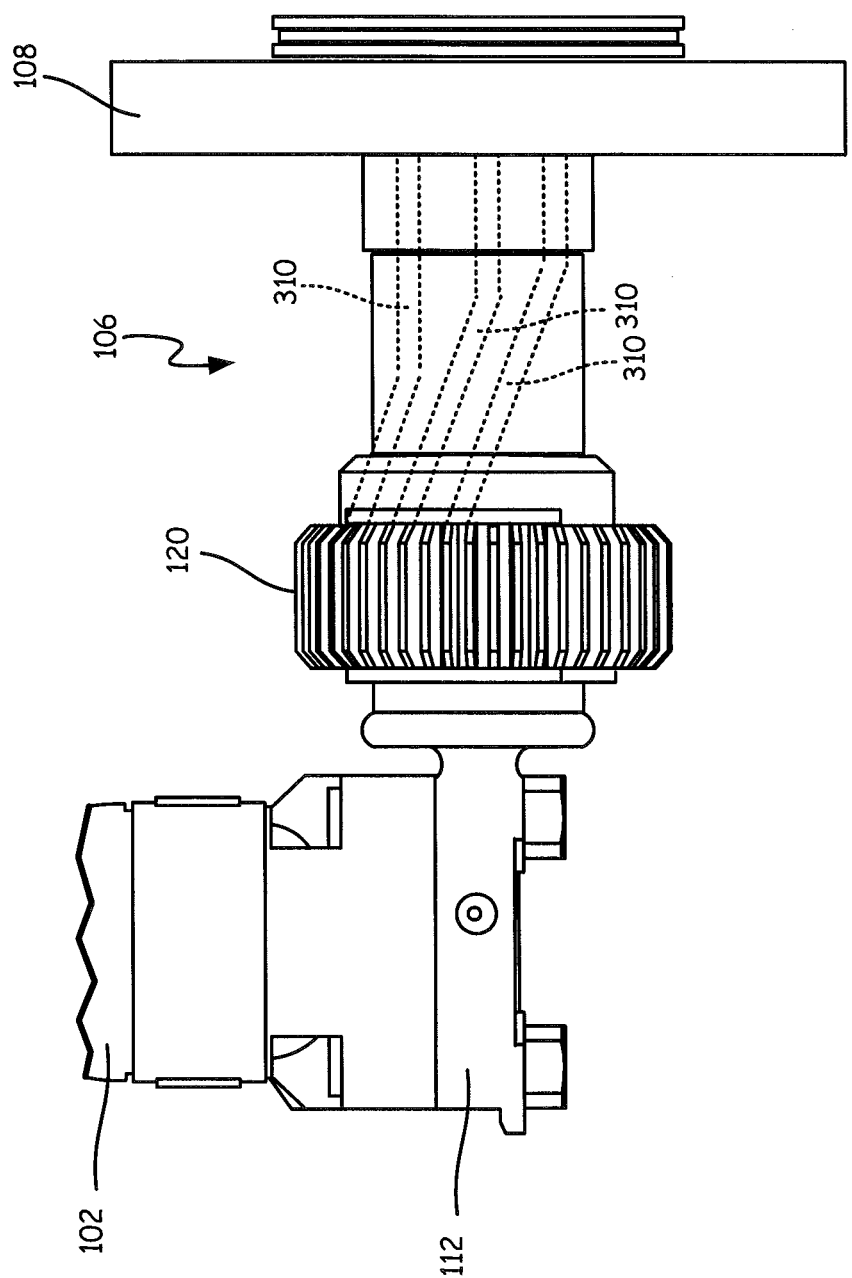
FIG. 3B is a side plan view of the process variable transmitter assembly of FIG. 1.
Figure 3C:
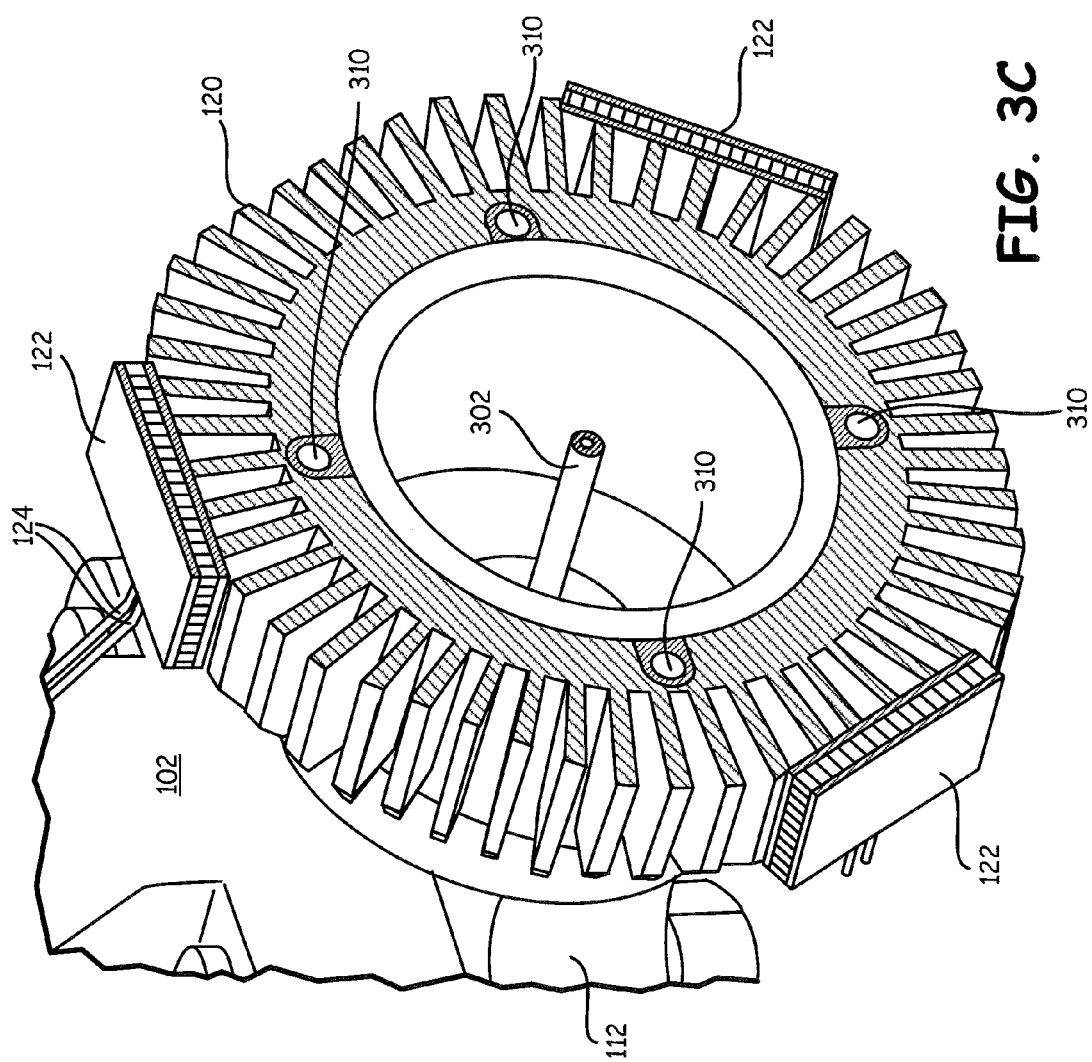
FIG. 3C is a side plan, cross sectional perspective view illustrating a heat sink, phase change material and thermal electric cooling elements.

FIG. 3A is a cross sectional perspective view, FIG. 3B is a side plan view and FIG. 3C is a cutaway perspective view showing process coupling 106 in greater detail. As illustrated in FIG. 3A, process flange face 108 includes an isolation diaphragm 300 configured to receive a process pressure P from process fluid 104. On the opposite side of isolation diaphragm 300 is an elongate capillary tube 302 which extends through elongate housing 110. Capillary tube 302 carries an isolation fluid which is preferably incompressible such as an oil. Capillary tube 302 extends to a second isolation diaphragm 304 which itself couples to isolation fluid which extends to the pressure sensor (not shown) in transmitter 102 which is not illustrated in FIG. 3A. As pressure is applied to the diaphragm 300, this pressure is transferred to the isolation fluid within capillary tube 302 and to isolation diaphragm 304.

FIGS. 3A and 3B also illustrate closed phase change material (PCM) tubes 310. PCM tubes 310 carry a phase change material (PCM) material 312 therein. Heat from the process fluid 104 which is transferred through flange 108 is illustrated by arrows 320. This heat causes the heating of the phase change material 312 within tubes 310. The heating causes the PCM material 312 to change state, for example, from a liquid to a gas state. The phase change requires additional energy, known as the "heat of vaporization" to be drawn from the flange face 108. After the PCM material 312 changes state, it flows from a process end 322 of tubes 310 to a transmitter end 324. For example, in the gaseous state, the PCM material 312 may weigh less than when in a solid state. If the coupling 106 is oriented such that the transmitter ends 324 are higher than the process ends 322 of tubes 310, the gaseous phase change material 312 will tend to flow away from the flange 108 and toward the process ends 324. This causes heat from the process fluid 104 to be drawn away from flange 108 and toward heat sink 120 as illustrated by arrows 330. The PCM tubes 310 may be arranged axially around the elongate housing 110 for effective use in horizontal or vertical mount arrangements. As air moves past the fins of the heat sink 120, heat is drawn away from the heat sink 120 as illustrated by arrows 332. This process allows the PCM material 312 to cool and change state. For example, the material may change from a gaseous state to a liquid state, or from a liquid state to a solid state. In this process, the PCM material returns to the process ends 322 of tubes 310 whereby the cooling cycle may repeat. The PCM material may be selected as desired. Example preferred materials include water, Aromatic (DEB), Silicate-ester (Coolanol 25R), Aliphatic (PAO), Silicone (Syltherm XLT), Fluorocarbon (FC-77), EG/Water (50:50 (v/v)), PG/Water (50:50 (v/v)), Methanol/Water 40:60 (wt./wt.), Ethanol/Water 44:56 (wt./wt.), Potassium Formate/Water 40:60 (wt./wt), and Ga—In—Sn. As the PCM material changes state from a liquid to a gas (or a solid to a liquid), this phase transition requires more heat be transferred from the process. This is known as "the heat of fusion" of the material. Similarly, as the phase change material transitions from a gas to a liquid (or from a liquid to a solid), it gives off a large amount of heat energy due to its high heat of fusion. The material should be selected to not only have a high heat of fusion, but also have a phase change which occurs at a desired temperature based upon the temperature of the industrial process and the desired operating temperature range of the process variable transmitter 112.

Preferably, the tubes 310 are arranged such that the PCM material flows in a direction toward the heat sink 120. This flow may, for example, be due to the effect of gravity on the system. For example, in a gas phase, the PCM material may flow in a upwardly direction whereas in a liquid phase, the PCM material may tend to settle at a physically lower point in the system. Thus, as illustrated in FIG. 3A, the heat sink 120 may be oriented at a higher position than the flange face 108. FIG. 3B shows another example configuration in which this system is arranged horizontally. In such a configuration, the PCM tubes 310 can be directed in an upward direction as they extend from flange face 108 to the heat sink 120. However, other configurations may also be implemented.

FIGS. 3A and 3C also illustrate thermal electric cooling elements 122 coupled to the heat sink 120. These can be controlled by circuitry contained within the transmitter 102. Thermal electric cooling elements 122 operate in accordance with known techniques. When a current has passed through elements 122, heat is transferred in a direction determined by the direction of the applied current. Thus, thermal electric cooling elements 122 can be used to draw additional heat away from heat sink 120 and thereby accelerate the cooling process of the phase change material 312. Elements 122 may be used independently and do not require the use of a phase change material or a heat sink if desired. Any number of thermal electric cooling elements may be arranged around the conduit. Such elements generally operate in accordance with the Seebeck effect in which an electrical potential created at a junction of two dissimilar metals will cause heat to be transferred across the junction. Similar electric coolers are also known to use the Peltier effect to create a heat flux between two different dissimilar types of materials. For example, n-type and a p-type semiconductor materials can be placed together and used to create a thermal electric cooling element. The amount of the heat transfer is related to the applied voltage. When a voltage is applied to the element, a DC current flows across the junction causing the temperature difference to arise.

Figure 4:
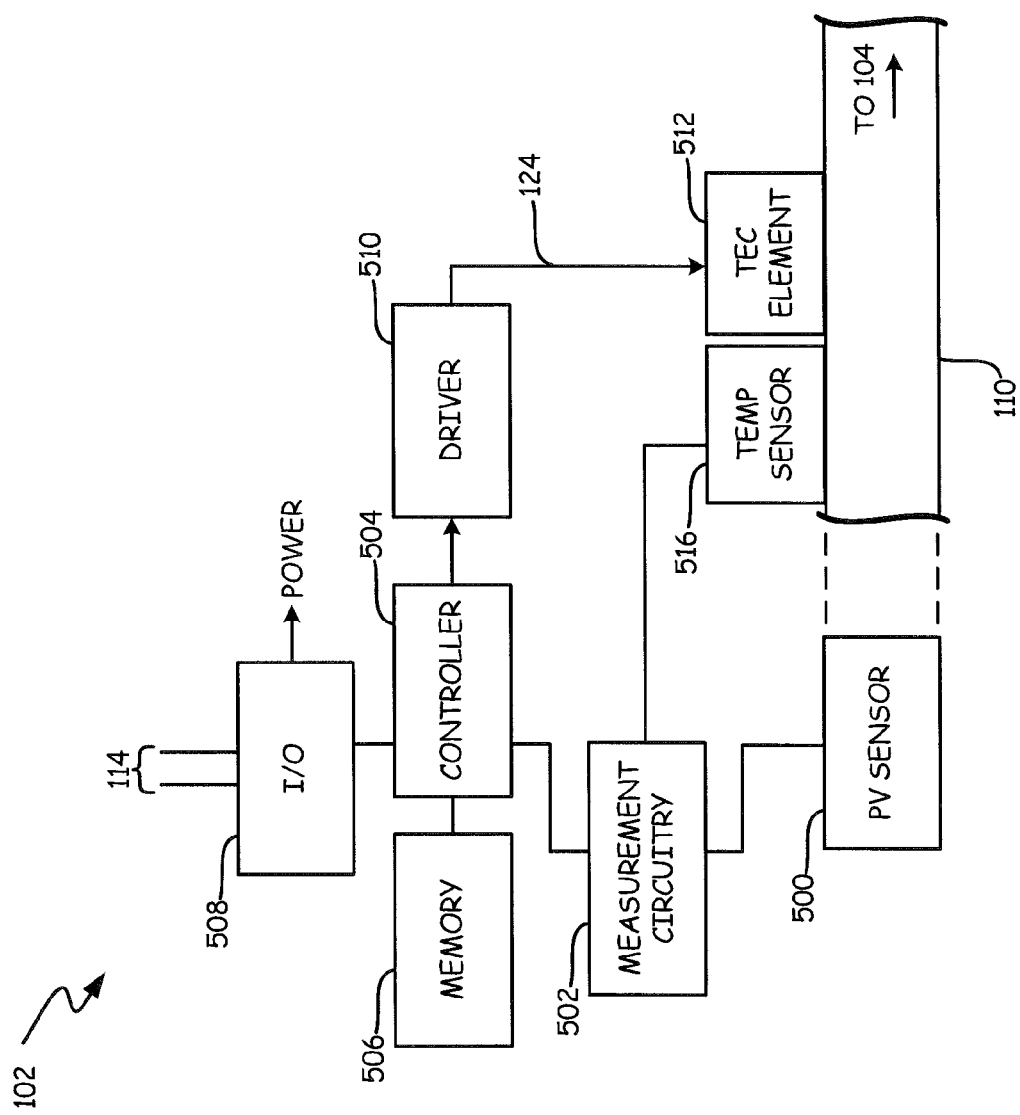
FIG. 4 is a simplified block diagram of the process variable transmitter assembly of FIG. 1.

FIG. 4 is a simplified block diagram showing components of process variable transmitter 102. In FIG. 4, a process variable sensor 500 is illustrated which, as discussed above, may be a pressure sensor. Sensor 500 couples to the process 104 through elongate housing 110 as described above. An output from the process variable sensor is provided to measurement circuitry 502. Such circuitry may include, for example, an analog to digital converter, filtering circuitry, etc. A digitized output is provided to controller 504 for measurement circuitry 502. Controller 504 may comprise, for example, a microprocessor or the like, which operates in accordance with programming instructions stored in memory 506. Controller 504 provides an output based upon the sensed process variable using input/output circuitry 508. In FIG. 4, I/O circuitry 508 is illustrated as connecting to the process control loop 114. However, the invention is not limited to such a configuration. In one example, I/O circuitry 508 also provides a power output which provides power to electrical components of the process variable transmitter 102. For example, such power may be derived from the process control loop 114.

Process variable transmitter 102 also includes driver circuitry 510 which couples the thermal electric cooling element 512. Driver circuitry may comprise, for example, circuitry which applies an electrical current to element 512. Such a current may comprise, for example, a direct current having a polarity which causes element 512 to draw heat away from elongate housing 110.

FIG. 4 also illustrates an optional temperature sensor 516. In the configuration illustrated in FIG. 4, the output from the temperature sensor 516 is provided to measurement circuitry 502 for use by controller 504. Temperature sensor 516 allows a feedback control mechanism to be used to control operation of thermal electric cooling element 512. For example, if the temperature of conduit 512 is below a maximum desired threshold, the controller 504 can turn off element 512 using driver circuitry 510. Similarly, the amount of cooling afforded by thermal electric cooling element 512 can be controlled by controlling the electrical current applied by driver circuitry 510. This allows the controller 504 to control the amount of heat which is being drawn away from conduit 112. Thus, if the conduit 112 is at a particularly high temperature, a larger current may be applied to element 512 thereby increasing the rate of heat transferred. Similarly, if the conduit 112 is near a lower threshold temperature, a small amount of current may be applied. Such configurations may be advantageous in order to reduce power consumption. In one example embodiment, a battery or other power storage device is carried in the transmitter 102 for powering the thermal electric cooling element 512.

Although the present invention has been described with reference to preferred embodiments, workers skilled in the art will recognize that changes may be made in form and detail without departing from the spirit and scope of the invention. As discussed above, the thermal electric cooling elements and/or the phase change material discussed above can be implemented in combination or individually. Although the components are illustrated as arranged around a conduit, other configurations may also be implemented. In some instances, it may be desirable to apply heat to a conduit. The thermal electric cooling element can be used in such a situation by reversing the voltage applied to the driver 510. Further, in one configuration, the temperature sensor 516 is included within the TEC element 512. Similarly, the feedback circuitry may also be included within element 512 as can a power source. In such a configuration, it may be possible to use a TEC element 512 without a connection to the field device 102. Although cooling is discussed generally herein, the thermoelectric cooling element can also be operated in a reverse configuration in which the conduit is heated. Further, although in the configurations illustrated, the closed tubes which carry the phase change material extend from the flange face 108 to the transmitter 102, other configurations may also be implemented. The PCM tubes 310 do not necessarily need to extend the entire length of the elongate housing 110. Further, although tubes are illustrated, other configurations may also be implemented. When in a heated state, it is preferable that the phase change material move to the transmitter end of the tube. When in a cooled state, which is cooler than the heated state, the phase change material moves to the process end of the tube. In one example configuration, the PCM tubes are oriented in an upward direction as they extend from a process coupling to a cooling element such as a heat sink and/or TEC element. The TEC element can be responsive to any appropriate electric signal.

What is claimed is:

1. A pressure transmitter assembly for measuring a process pressure of an industrial process, comprising:
a pressure sensor configured to sense the process pressure;
a process coupling configured to couple the pressure sensor to the industrial process; and
a phase change material carried in the process coupling configured to reduce heat transfer from the industrial process to a process variable sensor by changing phase in response to heat from the industrial process;
wherein the process coupling includes an isolation diaphragm coupled to a capillary tube to thereby couple a process pressure applied to the isolation diaphragm to the pressure sensor.

2. The pressure transmitter assembly of claim 1, including a thermoelectric cooling element coupled to the process coupling configured to conduct heat away from the coupling in response to an applied electric current.

3. The pressure transmitter assembly of claim 1, including a heat sink coupled to the process coupling.

4. The pressure transmitter assembly of claim 3, wherein the heat sink comprises a plurality of fins.

5. The pressure transmitter assembly of claim 3, including a thermoelectric cooling element coupled to the heat sink.

6. The pressure transmitter assembly of claim 1, wherein the phase change material is carried in a tube.

7. The pressure transmitter assembly of claim 6, wherein the tube runs parallel with a length of the process coupling.

8. The pressure transmitter assembly of claim 6, wherein the tube extends between a process end and a pressure sensor end.

9. The pressure transmitter assembly of claim 8, wherein the phase change material is heated proximate the process end.

10. The pressure transmitter assembly of claim 9, wherein the phase change material is cooled proximate the pressure sensor end.

11. The pressure transmitter assembly of claim 8, wherein the phase change material circulates between the process end and the pressure sensor end.

12. The pressure transmitter assembly of claim 2, including a driver circuit configured to provide power to the thermoelectric cooling element.

13. The pressure transmitter assembly of claim 2, including a temperature sensor proximate the thermoelectric cooling element.

14. The pressure transmitter assembly of claim 13, including a driver circuit configured to apply a current to the thermoelectric cooling element in response to a sensed temperature by the temperature sensor.

15. The pressure transmitter assembly of claim 5, wherein heating of the phase change material causes the phase change material to change state and move from the process end to the pressure sensor end.

16. A pressure transmitter assembly for measuring a process pressure of an industrial process, comprising:
a pressure sensor configured to sense the process pressure;
a process coupling configured to couple the pressure sensor to the industrial process; and
a thermocouple electric cooling element coupled to the process coupling configured to conduct heat away from the coupling in response to an applied electric signal;
wherein the process coupling includes an isolation diaphragm coupled to a capillary tube to thereby couple a process pressure applied to the isolation diaphragm to the pressure sensor.

17. The pressure transmitter assembly of claim 16, including a phase change material carried in the process coupling configured to reduce heat transfer from the industrial process to the process variable sensor by changing phase in response to heat from the industrial process.

18. The pressure transmitter assembly of claim 16, including a heat sink coupled to the process coupling.

19. The pressure transmitter assembly of claim 17, wherein the phase change material is carried in a tube.

20. The pressure transmitter assembly of claim 19, wherein the tube extends between a process end and a pressure sensor end.

21. The pressure transmitter assembly of claim 20, wherein the phase change material circulates between the process end and the pressure sensor end.

22. The pressure transmitter assembly of claim 16, including a driver circuit configured to provide power to the thermoelectric cooling element.

23. The pressure transmitter assembly of claim 16, including a temperature sensor proximate the thermoelectric cooling element.

24. The pressure transmitter assembly of claim 23, including a driver circuit configured to apply the signal to the thermoelectric cooling element in response to a sensed temperature by the temperature sensor.

25. A process coupling for coupling a process variable transmitter to a process fluid of an industrial process comprising:
an elongate housing having a flange configured to couple the process fluid and an opposed transmitter coupling configured to couple to the process variable transmitter;
a capillary in the elongate housing which conveys a process pressure at the flange to the transmitter coupling;
a tube carried by the elongate housing which extends in a direction between the flange and the process variable transmitter coupling; and
a phase change material carried in the tube configured to reduce heat transfer from the industrial process to the process variable transmitter.

26. The process coupling of claim 25 including a thermoelectric cooling element configured to conduct heat away from the process coupling in response to an applied electric signal.

27. A process coupling for coupling a process variable transmitter to a process fluid of an industrial process comprising:
an elongate housing having a flange configured to couple the process fluid and an opposed transmitter coupling configured to couple to the process variable transmitter;
a capillary in the elongate housing which conveys a process pressure at the flange to the transmitter coupling;
a thermoelectric cooling element configured to conduct heat away from the process coupling in response to an applied electric signal.

28. The process coupling of claim 27 including:
a tube carried by the elongate housing which extends in a direction between the flange and the process variable transmitter coupling; and
a phase change material carried in the tube configured to reduce heat transfer from the industrial process to the process variable transmitter.

* * * * *